United States Patent
Cheung

(10) Patent No.: US 9,230,736 B2
(45) Date of Patent: Jan. 5, 2016

(54) PLANAR ELECTRODES AND A METHOD OF CONTROLLING SPACING BETWEEN ELECTRODES

(75) Inventor: William S. H. Cheung, London (GB)

(73) Assignee: ADC TECH INTERNATIONAL LTD., Hong Kong (HK)

(*) Notice: Subject to any disclaimer, the term of this patent is extended or adjusted under 35 U.S.C. 154(b) by 591 days.

(21) Appl. No.: 13/309,946

(22) Filed: Dec. 2, 2011

(65) Prior Publication Data

US 2012/0118611 A1    May 17, 2012

Related U.S. Application Data

(63) Continuation of application No. PCT/US2010/056746, filed on Nov. 15, 2010.

(60) Provisional application No. 61/261,078, filed on Nov. 13, 2009.

(51) Int. Cl.
| | |
|---|---|
| *H01B 5/00* | (2006.01) |
| *H05K 3/10* | (2006.01) |
| *H01G 4/005* | (2006.01) |
| *H01G 4/002* | (2006.01) |

(52) U.S. Cl.
CPC ............... *H01G 4/005* (2013.01); *H01G 4/002* (2013.01); *Y10T 29/49155* (2015.01)

(58) Field of Classification Search
CPC .......................................... H01G 4/002–4/005
USPC .................... 361/306.2, 326, 301.4, 301.2
See application file for complete search history.

(56) References Cited

U.S. PATENT DOCUMENTS

| | | | |
|---|---|---|---|
| 1,905,264 A | 4/1933 | Campbell et al. | |
| 2,221,671 A | 11/1940 | Cooper | |
| 2,308,694 A * | 1/1943 | Jenner | 361/279 |
| 3,377,852 A | 4/1968 | Leistra | |
| 3,727,117 A | 4/1973 | Robinson | |
| 5,606,486 A | 2/1997 | Moncrieff | |
| 6,075,806 A | 6/2000 | Wittle et al. | |
| 6,775,124 B2 | 8/2004 | Cheung | |
| 7,115,854 B1 * | 10/2006 | Kato et al. | 250/214 VT |
| 7,277,267 B1 * | 10/2007 | Bonin | 361/290 |
| 7,387,928 B2 | 6/2008 | Cheung | |
| 7,813,105 B2 | 10/2010 | Cheung | |
| 8,156,622 B2 | 4/2012 | Cheung | |
| 2004/0087062 A1 | 5/2004 | Ohuchi | |
| 2008/0130197 A1 * | 6/2008 | Cheung | H01G 4/30 361/301.4 |
| 2012/0194964 A1 | 8/2012 | Cheung | |

* cited by examiner

*Primary Examiner* — Tremesha S Willis
*Assistant Examiner* — Michael E Moats, Jr.
(74) *Attorney, Agent, or Firm* — The Belles Group, P.C.

(57) ABSTRACT

An electronic component comprising a first electrode, a second electrode, and a plurality of ball spacers is disclosed. The first electrode includes a plurality of first through holes formed according to a pattern. The second electrode includes a plurality of second through holes formed according to the pattern. Conductive surfaces of the first and second electrode face each other and the first through holes align with the second through holes. The plurality of ball spacers is disposed between the first and second electrodes. Each ball spacer is disposed between and partially disposed within pairs of aligned through holes.

16 Claims, 3 Drawing Sheets

PLANAR ELECTRODES AND A METHOD OF CONTROLLING SPACING BETWEEN ELECTRODES

PRIORITY

Priority is claimed to PCT application No. PCT/US2010/056746, filed on Nov. 15, 2010 and published in English, which claims priority to U.S. provisional application Ser. No. 61/261,078, filed on Nov. 13, 2009. The disclosures of the aforementioned priority documents are incorporated herein by reference in their entirety.

BACKGROUND OF THE INVENTION

1. Field of the Invention

The field of the present invention is parallel electrodes, such as capacitors, which are operable in high frequency and/or microwave circuit applications.

2. Background

Radio communication services are becoming so numerous they are reaching the 50 GHz millimeter wave spectrum. As the demand for more telecommunications services increases, and the spectrum becomes increasingly crowded, it is foreseeable that applications in the 50-300 GHz millimeter wave spectrums will be utilized for various telecommunications applications.

Circuits for generating and processing signals in the millimeter wave spectrum present significant challenges to component designers. As the frequencies increase, the quality of the components becomes increasingly difficult to maintain. Specifically, for a basic capacitor utilized in circuits operating at these frequencies, the internal equivalent series resistance (ESR) increases significantly using known dielectrics and construction techniques for microwave capacitors. Upper frequency spectrum applications in the UHF (300 MHz to 3.0 GHz) to SHF (3 GHz to 300 GHz) ranges are limited because dielectric materials used in the capacitors exhibit a significant change in ESR with frequency. As the frequency increases for a typical high frequency capacitor, the ESR can increase from 0.05 ohm at 200 MHz to significantly higher ESR and higher losses can be expected. Additionally, the dielectric constant ($\in$) also changes as frequencies increase. Thus, capacitors in particular have a practical upper limit in the UHF to SHF frequency spectra when they are constructed with conventional dielectric materials.

One of the more advantageous dielectrics is air. U.S. Pat. No. 6,775,124 and U.S. Pat. No. 7,387,928, the disclosures of which are incorporated herein by reference in their entirety, each disclose capacitors, and methods for making such capacitors, which may be formed with air as the dielectric between the electrode plates of the capacitor. As is seen in U.S. patent publication No. 2008/0130197, the disclosure of which is incorporated herein by reference in its entirety, such capacitors may be stacked in series or parallel to form high capacitance and high voltage capacitors which are capable of operating at high frequencies.

While these types of capacitors can function well for their intended purpose, one drawback from which they may suffer is a hybrid capacitance resulting from a combination of the capacitance from the intended dielectric (i.e., vacuum, air, gas, etc.) with the capacitance from the spacer(s) separating the electrode plates. Such a hybrid capacitor, while useful in many applications, may suffer from unwanted intrinsic limitations, degradations, performance losses, and/or RF losses, among other things, when used in circuits operating in the upper GHz range.

SUMMARY OF THE INVENTION

The present invention is directed towards an electronic component comprising a first electrode, a second electrode, and a plurality of ball spacers. The first electrode includes a plurality of first through holes formed according to a pattern. The second electrode includes a plurality of second through holes formed according to the pattern. Conductive surfaces of the first and second electrodes face each other and the first through holes align with the second through holes. The plurality of ball spacers are disposed between the first and second electrodes. Each ball spacer is disposed between and partially disposed within pairs of aligned through holes.

Accordingly, an improved electronic component is disclosed. Advantages of the improvements will appear from the drawings and the description of the preferred embodiment.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
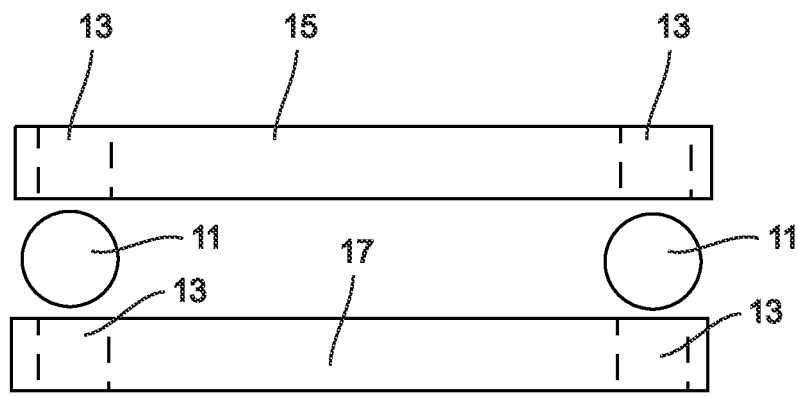
FIG. 1 illustrates the alignment between ball spacers and through holes in each of two electrodes for forming a capacitor.
Figure 2:
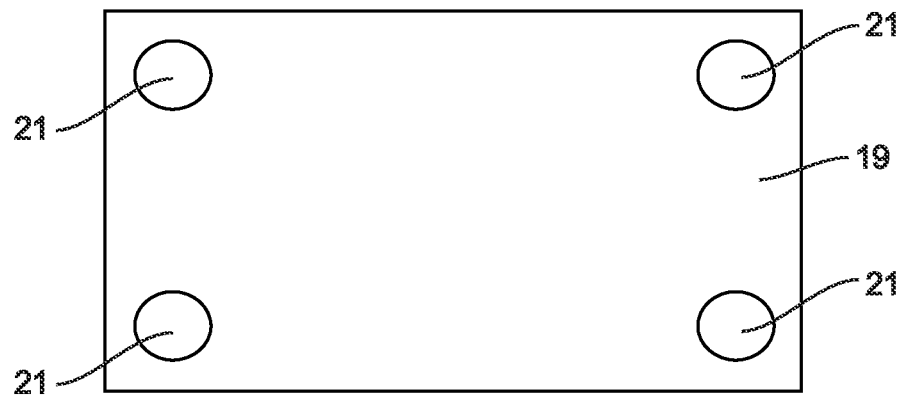
FIG. 2 shows a through hole pattern for an electrode.

Turning in detail to the drawings, FIG. 1 illustrates the alignment of ball spacers 11 with the alignment through holes 13 formed in top and bottom electrodes 15, 17. The ball spacers 11 are constructed from a non-conducting material, such as a ceramic material. Any other non-conducting material may be used to construct the ball spacers 11. The alignment through holes 13 in each of the top and bottom electrodes 15, 17 have a diameter that is smaller than the diameter of each of the ball spacers 11, and they are formed using the same distribution pattern in each electrode 15, 17. Thus, when the electrodes are placed opposite each other as shown in FIG. 1, each through hole in one of the electrodes aligns with a through hole in the other electrode to form an aligned pair. FIG. 2 illustrates a rectangular electrode 19 having four alignment through holes 21 placed in a rectangular distribution pattern about the electrode 19. In practice, the electrode may have any desired geometrical configuration, and there may be any number of alignment through holes placed in any desired distribution pattern about the electrode. While the following discussion is presented in terms of constructing a capacitor, those skilled in the relevant arts will recognize that the concepts presented herein have wide application outside the field of capacitors.

Figure 3:
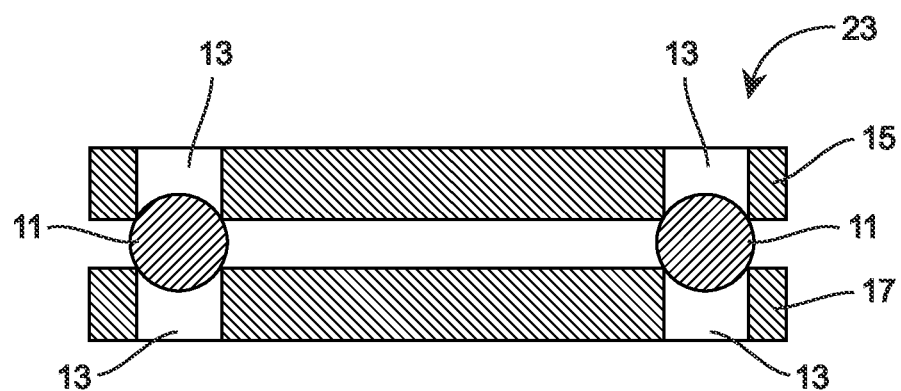
FIG. 3 is a sectional view of an assembled capacitor.

An assembled capacitor 23 is illustrated in FIG. 3. In assembling this capacitor, following formation of the alignment through holes 13 in each of the top and bottom 15, 17 electrodes, the ball spacers 11 are placed onto the bottom electrode 17, with a ball spacer 11 positioned at each alignment through hole 13. The ball spacers 11 with its larger diameter, will partially rest within the respective alignment through holes 13 of the bottom electrode 17 as illustrated. Once all of the ball spacers 11 are in place on the bottom electrode 17, the top electrode 15 is placed onto the ball spacers 11, with the alignment through hole pattern in each of the top and bottom electrodes 15, 17 aligned with the same relative orientation. In this manner, when the top electrode 15 is placed, the ball spacers 11 will also partially rest within the respective alignment through holes of the top electrode 15. Optionally, an adhesive may be placed in each of the alignment through holes 13 prior to assembly so that when the ball spacers 11 are partially positioned in the alignment through holes 13, the adhesive will bond the ball spacers 11 to the electrodes, and it will also serve to hold the entire assembly together.

Components assembled in this manner benefit from a uniformly created gap spacing between the electrodes according to desired specifications. Further, as discussed in greater detail below, the gap spacing between the electrodes may vary widely by controlling the size of the ball spacers relative to the alignment through holes. And, while a non-uniform gap spacing may be achieved by using alignment though holes which are non-uniform in diameter across one or both electrodes, or by using ball spacers of non-uniform diameters, or through a combination of the two, a uniform gap spacing is preferred for the presently intended applications. However, even with a uniform gap spacing, the diameters of the various alignment though holes need not be uniform, nor need the diameters of the ball spacers. However, use of uniform sizes of through holes and ball spacers greatly simplifies the design and manufacturing processes.

Components assembled in this manner also expected to benefit from the ball spacer contributing minimally, if any contribution is made at all, to the overall capacitance of the component. While it is anticipated that the ball spacer will not contribute to the overall capacitance of the component, empirical data in support of this conclusion is not presented herein.

Figure 4:
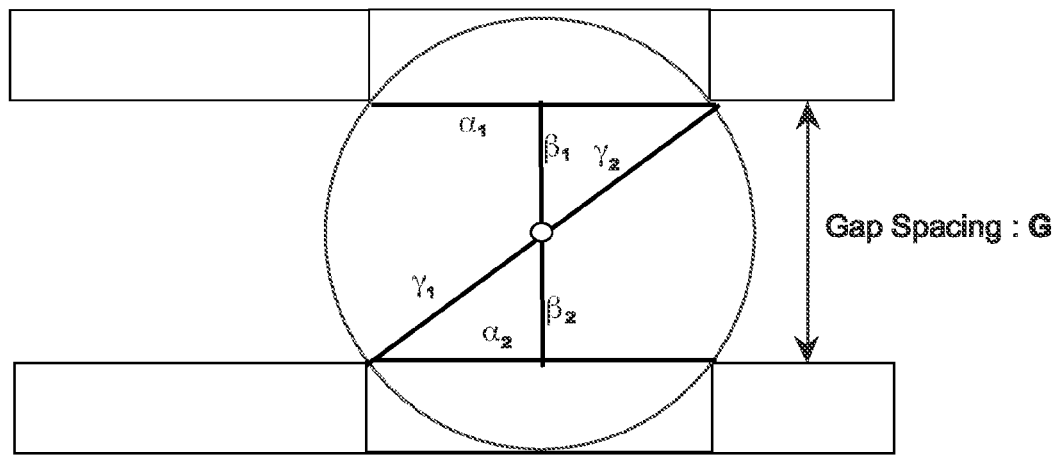
FIG. 4 illustrates the geometrical relationship between ball spacer size, through hole size, and electrode gap spacing.

FIG. 4 illustrates the geometrical relationships between the through hole size, the ball spacer size, and the electrode gap spacing. Here, $\alpha_1$ represents the size of the through hole in the top electrode, $\alpha_2$ represents the size of through hole in the bottom electrode, $\gamma$ represents the radius of the ball spacer, and $\beta_1$ and $\beta_2$ represent the length of the line drawn from the center of the ball spacer to the chord in the ball spacer that is equal in length to the diameter of the through hole. Given this geometry, and where the through holes in each of the top and bottom electrode are of equal sizes, the final electrode gap spacing, $\delta$, is determined by the following equation:

$$\delta = 2[\gamma^2 - (\beta/2)^2]^{0.5}.$$

Figure 5:
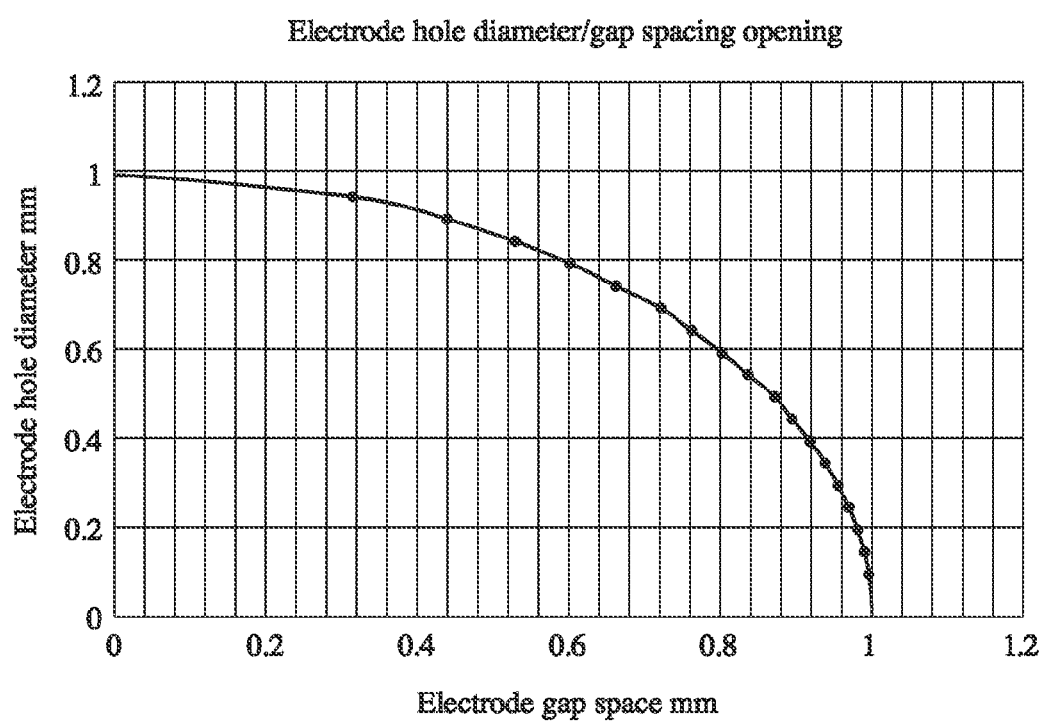
FIG. 5 is a graph illustrating the size relationship between through hole diameters and electrode gap spacing for ball spacers of 1 mm diameter.

The relationship between the through hole diameter and the electrode gap spacing for 1 mm ball spacer is graphically illustrated in FIG. 5. This graph shows that for diameters ranging from about 0.999 mm to about 0.2 mm, the final electrode gap spacing is about 0.045 mm to about 0.98 mm. This graph further illustrates that a large range of electrode gap spacing may be achieved simply by varying the diameter of the alignment through holes formed in the electrodes. In addition, a skilled artisan will recognize that use of a ball spacer having a diameter other than 1 millimeter will alter the relationship between the through hole diameter and the electrode gap spacing, thus enabling greater control over the design parameters of such assembles.

Figure 6:
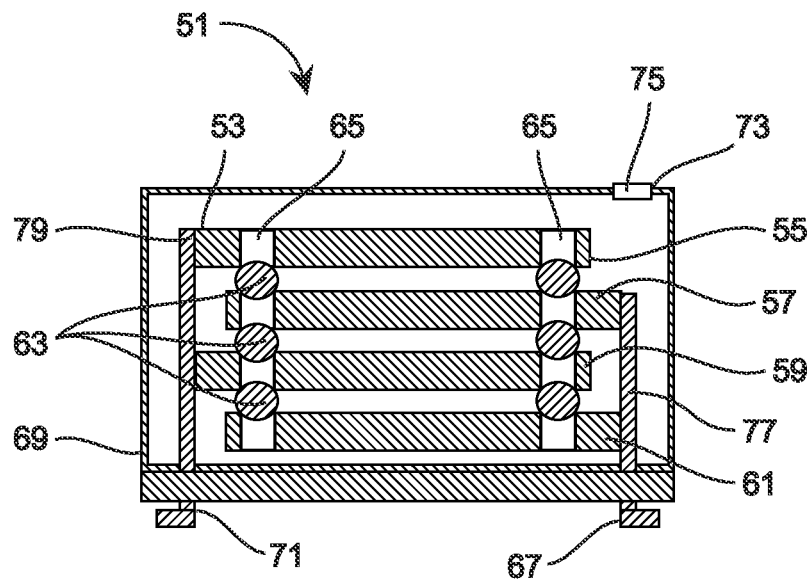
FIG. 6 is a sectional view of a multi-layer parallel electrode capacitor.

The method described above for fabricating a two electrode capacitor may easily be adapted and extended to fabricate the multi-electrode capacitor 51 shown in FIG. 6. This capacitor 51 has a stack 53 of four electrodes 55, 57, 59, 61, although more may be included depending upon the desired functional specifications. Spacing between adjacent electrodes in the stack 53 is achieved using ball spacers 63 and through holes 65 as described above. The bottommost electrode 61 in the stack 53 includes a leg 67 which extends to the underside of the encapsulate 69 to facilitate surface mounting of the capacitor 51. Likewise, the next electrode 59 in the stack 53 also includes a leg 71 which extends to the exterior of the encapsulate 69. During fabrication of the encapsulate 69, a vent hole 73 is left in a portion of the encapsulate 69 so that gas may be inserted into the spacing between the electrodes, or the volume within the encapsulate 69 may be evacuated. Once the desired filler or vacuum has been created, an epoxy sealant 75 is placed into the vent hole 73 to maintain the filler or vacuum within the encapsulate 69.

Within the stack 53, every other electrode is electrically coupled by solder joints. As shown, the bottommost electrode 61 is electrically coupled to the third electrode 57 through a first solder joint 77, and the second electrode 59 is coupled to the fourth electrode 55 through a second solder joint 79. Thus, an electrical path is created between pair of adjacent electrodes such that each pair serves as one of a plurality of capacitors connected in parallel for the circuit in which the stack is incorporated. Following creation of the stack 53, the encapsulate 69 is placed around the entire stack 53, leaving the legs 67, 71 of the two lowest electrodes in the stack exposed. In practice, any portion of any two electrodes may extend outside the encapsulate.

The multi-layer parallel capacitor 51 described above groups several electrodes together in parallel to achieve a higher capacitance than a two electrode capacitor with the identical electrode area. In addition, the working voltage for the multi-layer capacitor is anticipated to be the same as for a two electrode capacitor, thus providing high operating voltage and high capacitances for use in high frequency circuits in the range of GHz and above.

Figure 7:
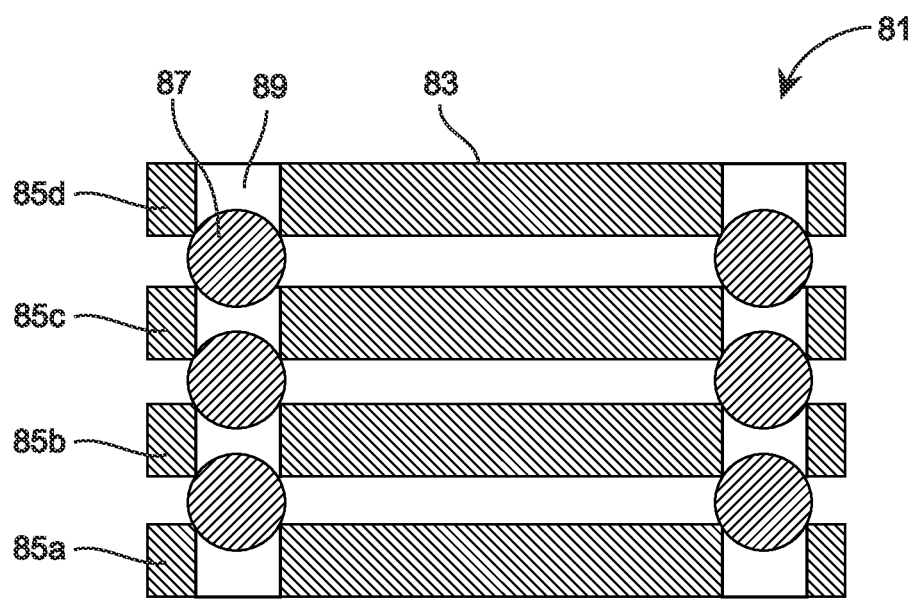
FIG. 7 is a sectional view of a multi-layer series electrode capacitor.

A second multi-electrode capacitor 81 is shown in FIG. 7. This stack 83 includes four electrodes 85a-85d forming capacitors in series. The spacing between the electrodes is again formed in the same manner as previously described, with ball spacers 87 and through holes 89. In the same manner described above with respect to FIG. 6, an encapsulant (not shown) may be placed about the entire stack and the entire volume within the encapsulant filled with a gas or evacuated as desired. However, with this series stack, a first leg (not shown) would extend from the bottom electrode 85a to outside the encapsulant, and a second leg (not shown) would similarly extend from the top electrode 85d to outside the encapsulant. The legs would allow the multi-layer capacitor 81 to be incorporated into an electronic circuit. As an alterative, this stack 83 of electrodes could be sealed in the same manner disclosed in U.S. Patent Publication No. 2008/0130197 for the capacitors in series.

The multi-layer series capacitor 81 described above groups several electrodes together in series to achieve a higher working voltage than a two electrode capacitor with the identical electrode area. In addition, the capacitance for the multi-layer capacitor is anticipated to be the same as for a two electrode capacitor, thus providing a very high operating voltage and high capacitance for use in high frequency circuits in the range of GHz and above.

Beyond capacitors, additional components can be implemented with the device and methods of the present invention discussed above. For example, with regard to transmission lines, components constructed in the manner described may be used to implement parallel strips/striplines components with electrodes having an air, gas or vacuum dielectric between the electrodes. As discussed above, since an air dielectric in particular has no practical limitations with respect to RF losses, these transmission line devices may be developed well into the upper GHz frequency spectrum. Thus, components constructed in the manner described can also be used to provide low loss transmission lines well into the high GHz frequency range. Further, components constructed in the manner described may also be used in any of the applications described in U.S. Patent Publication No. 2008/0130197.

Thus, planar electrodes and a method of controlling spacing between electrodes are disclosed. While embodiments of this invention have been shown and described, it will be apparent to those skilled in the art that many more modifications are possible without departing from the inventive concepts herein. The invention, therefore, is not to be restricted except in the spirit of the following claims

What is claimed is:

1. An electronic component comprising:
 a first electrode having a plurality of first through holes formed according to a pattern;
 a second electrode having a plurality of second through holes formed according to the pattern, wherein conductive surfaces of the first and second electrode face each other and the first through holes align with the second through holes;
 a plurality of ball spacers disposed between the first and second electrodes, wherein each ball spacer is disposed between and partially disposed within pairs of aligned through holes; and
 a gas state dielectric between the first and second electrodes, wherein the first electrode, the gas state dielectric, and the second electrode in combination form a capacitor.

2. The electronic component of claim 1, wherein the ball spacers comprise ceramic ball spacers.

3. The electronic component of claim 1, wherein a diameter of each ball spacer is greater than a diameter of each associated pair of aligned through holes.

4. The electronic component of claim 1, further comprising an adhesive disposed within each through hole, the adhesive adhering to the respective electrode and ball spacer.

5. The electronic component of claim 1, further comprising:
 a casing encapsulating the first and second electrodes; and
 first and second conducting surfaces exposed outside the casing, wherein the first conducting surface is electrically coupled to the first electrode, and the second conducting surface is electrically coupled to the second electrode.

6. The electronic component of claim 3, wherein the ball spacers set the first electrode apart from the second electrode by a gap distance, $\delta$, given by:

$$\delta = 2(\gamma^2 - (\beta/2)^2)^{0.5}$$

where $\gamma$ is a radius of the ball spacers and $\beta$ is a diameter of the through holes.

7. An electronic component comprising:
 a plurality of electrodes forming a stack of electrodes, wherein each pair of adjacent electrodes within the stack of electrodes are spaced apart from one another, each electrode has a plurality of through holes formed according to a pattern, and the pattern is identical for each electrode;
 a plurality of ball spacers disposed between each pair of adjacent electrodes, wherein each ball spacer is disposed between and partially disposed within pairs of aligned through holes to maintain spacing between the each respective pair of adjacent electrodes; and
 a gas state dielectric between each pair of adjacent electrodes, wherein each pair of adjacent electrodes and the gas state dielectric in combination form a capacitor,
 wherein the stack of electrodes forms a plurality of capacitors coupled together in series, and the plurality of capacitors are configured to operate to present a monolithic capacitance.

8. The electronic component of claim 7, further comprising:
 a casing encapsulating the stack of electrodes; and
 first and second conducting surfaces exposed outside the casing, wherein the first conducting surface is electrically coupled to a top electrode in the stack of electrodes, and the second conducting surface is electrically coupled to a bottom electrode in the stack of electrodes.

9. The electronic component of claim 7, wherein the ball spacers comprise ceramic ball spacers.

10. The electronic component of claim 7, wherein a diameter of each ball spacer is greater than a diameter of each associated pair of aligned through holes.

11. The electronic component of claim 7, further comprising an adhesive disposed within each through hole, the adhesive adhering to the respective electrode and ball spacer.

12. An electronic component comprising:
 a plurality of electrodes forming a stack of electrodes, wherein each pair of adjacent electrodes within the stack of electrodes are spaced apart from one another, each electrode has a plurality of through holes formed according to a pattern, and the pattern is identical for each electrode;
 a plurality of ball spacers disposed between each pair of adjacent electrodes, wherein each ball spacer is disposed between and partially disposed within pairs of aligned through holes to maintain spacing between the each respective pair of adjacent electrodes; and
 a gas state dielectric between each pair of adjacent electrodes, wherein each pair of adjacent electrodes and the gas state dielectric in combination form a capacitor,
 wherein the stack of electrodes forms a plurality of capacitors coupled together in parallel, and at least two non-adjacent ones of the electrodes are directly electrically coupled together.

13. The electronic component of claim 12, further comprising:
 a casing encapsulating the stack of electrodes; and
 first and second conducting surfaces exposed outside the casing, wherein the first conducting surface is electrically coupled to first alternating ones of the electrodes in the stack of electrodes, and the second conducting surface is electrically coupled to second alternating ones of the electrodes in the stack of electrodes.

14. The electronic component of claim 12, wherein the ball spacers comprise ceramic ball spacers.

15. The electronic component of claim 12, wherein a diameter of each ball spacer is greater than a diameter of each associated pair of aligned through holes.

16. The electronic component of claim 12, further comprising an adhesive disposed within each through hole, the adhesive adhering to the respective electrode and ball spacer.

* * * * *